Aug. 26, 1969  O. FREUDENSCHUSZ  3,463,580
MOTION PICTURE CAMERA HAVING MEANS FOR CHANGING
FILM CARTRIDGE AUTOMATICALLY
Filed Nov. 17, 1966  2 Sheets-Sheet 2

Inventor:
Otto Freudenschusz
By Ernest G. Montague
Attorney

United States Patent Office 3,463,580
Patented Aug. 26, 1969

3,463,580
MOTION PICTURE CAMERA HAVING MEANS FOR CHANGING FILM CARTRIDGE AUTOMATICALLY
Otto Freudenschusz, Vienna, Austria, assignor to Karl Vockenhuber and Raimund Hauser, both of Vienna, Austria
Filed Nov. 17, 1966, Ser. No. 595,134
Claims priority, application Austria, Nov. 19, 1965, A 10,454/65
Int. Cl. G03b 23/02
U.S. Cl. 352—73                                    20 Claims

ABSTRACT OF THE DISCLOSURE

A motion picture camera has a compartment for supporting spare film magazines. One film magazine is held in operable position in the camera such that the film is driven past the optical axis for exposure. When the end of the film in the magazine is reached, the camera automatically ejects the cartridge into a second compartment for magazines containing exposed film and inserts a spare cartridge into operative position.

This invention relates to a motion picture camera for use with film arranged in a cartridge, which camera is loaded in that the cartridge is slipped into the film chamber.

Difficulties in motion-picture cameras often occur as a result of the fact that the length of the film is limited. This disadvantage is mainly significant where a motion picture camera is remotely controlled. It has been attempted to solve this problem by designing such cameras for use with relatively long films. Whereas this expedient reduces the frequencwy of re-loadings, it does not solve the problem as such. For this reason, television cameras have been used for such purposes and the television signal has been recorded magnetically or on a film. Such systems have been used, e.g. for medical purposes and comprise a color television camera mounted in the lighting fixture used for illumination during medical operations, and television signal recording equipment mounted at a suitable location. The expenditure involved in such systems is extremely high.

It is an object of the present invention to avoid the disadvantages of the above-mentioned apparatus. The motion picture camera is characterized by a device for feeding a cartridge from a stack of cartridges and for moving this stack of cartridges to a delivery position. This device enables a supply of the camera with a sufficiently large number of cartridges so that a very long running time can be ensured, which is interrupted only by the very short loading periods. Extreme operating requirements can be complied with by the re-loading of the camera with new cartridges and the removal of the cartridges which contain exposed film.

In a preferred embodiment of the invention, the cartridge changing device is controlled by a footage counter, which returns to its initial position in known manner in response to a change of cartridges.

In another embodiment of the invention, the cartridge changing device is controlled by a feeler, which contacts the film and is released by the trailing end portion of the film or by an indentation in the trailing end portion of the film.

Further features of the invention will become apparent from the following description of an embodiment, which is shown by way of example in the drawing, in which.

Figure 1:
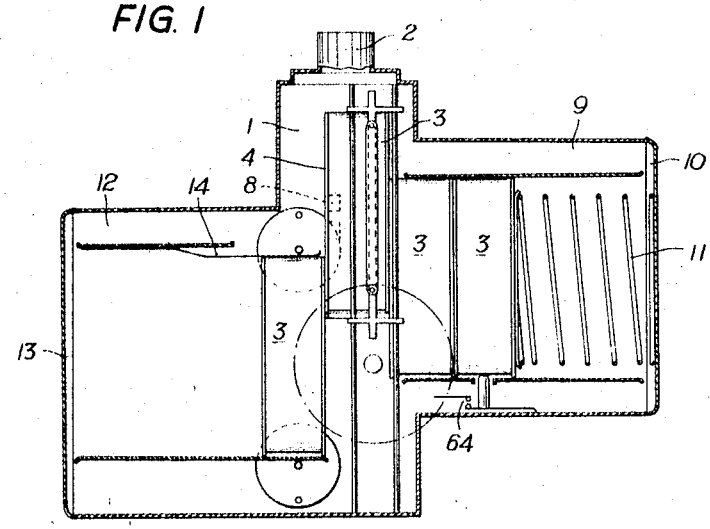
FIG. 1 is a diagrammatic sectional view showing the novel camera.

In the drawing, a camera body 1 carries a lens 2. The camera is arranged to be loaded with film cartridges of the type known as Super-8 cartridges. A cartridge 3 is slidably inserted into a film chamber 4 of the camera. A resilient pressure member 6 is provided in the cartridge and forces a film 5 against an aperture plate. The side wall of the cartridge is provided with a driven coupling element 7, which is operatively connected to the take-up spool of the cartridge and driven by a driving coupling element 8 of the camera. At the right-hand side wall of the camera, a guide opening 9 is provided, which serves for receiving cartridges 3 containing unexposed film. The guide opening is rendered accessible by the provision of a flap 10 and contains a spring 11, which tends to displace the cartridges to the left. Similarly, a guide opening 12 is provided on the left side of the camera and serves for the discharge of the cartridges in which the film has been exposed. The guide opening 12 is closed by a flap 13. A leaf spring 14 disposed inside the guide opening 12 serves for guiding the exposed cartridges.

A carriage 15 is provided for automatically loading cartridges into the camera. The carriage 15 is guided on rods 16, 17, which extend parallel to the optical axis. The carriage is driven by a disc 18, which carries a crankpin 19, to which a rod 20 is pivoted. One end 20a of rod 20 is mounted in the carriage. The disc 18 is driven by a worm gearing 21, 22 from a motor 23. The disc 18 is mounted on a shaft, to which a camwheel 24 is secured, which cooperates with an extension 25 of a lever 26. The latter is secured to a shaft 27, which has also secured to it a plate, not shown, in which the driving coupling element 8 for cooperating with the driven coupling element of the cartridge 7 is mounted. The lever 26 serves also for operating a switch 28, which is included in the circuit of the motor 23. The cam 24 is faced by switches 29, 30 and 31.

The carriage 15 comprises a longitudinal beam, which comprises lateral extensions for guided engagement with the rods 16 and 17, and a bar 32, which faces the end face of the cartridge, and another bar 33, which has a cross-member 34 carrying a leaf spring 35. During the forward movement of the carriage, the leaf spring 35 bears on the rear face of the cartridge and ensures that the latter is urged with sufficient pressure against the aperture plate.

Figures 2, 4:
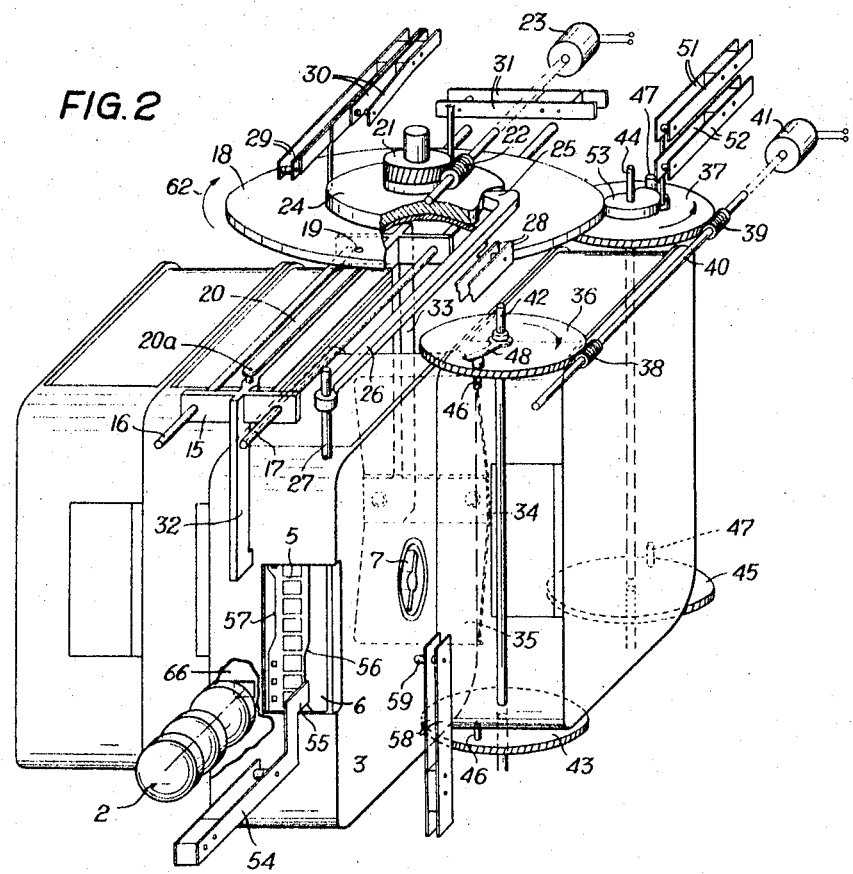
FIG. 2 is a perspective view illustrating the essential elements of the cartridge changing device.
FIG. 4 shows a detail of the assembly illustrated in FIG. 2.

The camera comprises two worm wheels 36 and 37, which are driven by oppositely handed worms 38 and 39 mounted on a common shaft 40, which is driven by a motor 41. The worm wheel 36 is secured to a shaft 42, which carries a disc 43. Similarly, the worm wheel 37 is connected by a shaft 44 to a disc 45 disposed at the base of the cartridge. Each of the discs 36, 37 and 43, 45, respectively, carries a pin 46 or 47. The pins 46 mounted in the discs 36 and 43 are axially slidable in said discs and loaded by springs 48. During a rotation of the discs 36, 37 and 43, 45, the pins 46 and 47 enter recesses formed in the top and bottom of the cartridge 3. These recesses are defined by the protruding side walls 49 and 50. By this operation of the pins 46 and 47, the latter displace the cartridge 3 transversely to the direction of movement of the carriage 15. Two switches 51 and 52 are provided for controlling the motors 23 and 41, respectively, and are operated by a camwheel 53, which is coupled to the worm wheel 37. A switch 54 is provided for controlling the movement of the carriage 15 and has a feeler 55, that bears resiliently on the side edge of the film. The film 5 is provided in its trailing end portion with an indentation 56, which receives the feeler 55 so that the switch 54 is closed. At the other end of the film, the perforations are replaced by a cut-out portion 57 so that the pull-down claw, not shown, of the camera is ineffective and the film is arrested in the position which is shown in FIG. 2 The circuit of the motor 23 includes also a switch 58, which has a pin 59 bearing resiliently on the side wall of the cartridge. The switch 58 is open when the pin 59 does not face a cartridge.

Figure 3:
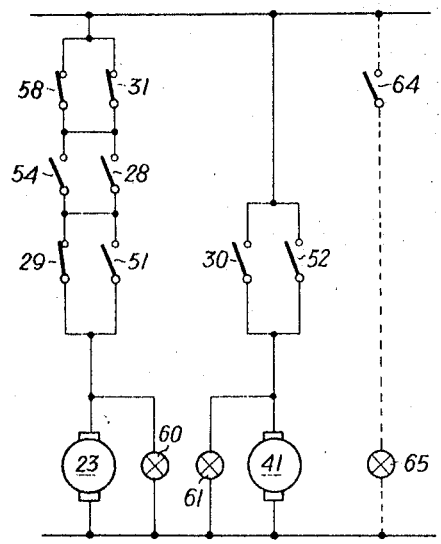
FIG. 3 is a circuit diagram of this device.

The mode of operation of the novel device will be explained more fully hereinafter with specific reference to FIG. 3. Those positions in which the various switches are shown in the circuit diagram of FIG. 3 correspond to a camera which is ready for shooting. In this position, the carriage 15 is in its forward end position (switch 28 open). The carriage contains a cartridge 3 so that the switch 58 is closed. The switch 54 is open as the feeler 55 engages the edge of the film. In this position the film can now be exposed. By the pull-down claw, not shown, the film is intermittently moved past the film gate. The parts and means used for this operation need not be explained because they do not belong to the invention. When the entire length of film has been unwound, the indentation 56 of the film 5 reaches the feeler 55 so that the switch 54 is closed to energize the motor 23. At the same time, the signal lamp 60 is lighted to indicate that the camera is not ready to shoot. By means of the worm gearing 21, 22, the motor 23 rotates the disc 18 and the camwheel 24 in the direction of the arrow 62 in FIG. 2. This causes first a rotation of the lever 26 in the clockwise sense to close the switch 28 and at the same time to disengage the driving coupling element 8 for the cartridge from the driven coupling element 7. The crank rod 20 subsequently retracts the carriage 15, which reaches its rear end position when the disc 18 has been rotated through about 180°. In this position of the system, the switch 29 is opened to deenergize the motor 23. At the same time, the switch 30 is closed to energize the motor 41 and a signal lamp 61. The motor 41 rotates the worm wheel 36 and the disc 43 in the clockwise sense by means of the worm 38 and rotates the worm wheel 37 and the disc 45 in the counterclockwise sense by means of the worm 39. This operation causes pins 46, 47, which are mounted in the said worm wheels and discs, to enter recesses formed at the top and bottom of the cartridge 3 by protruding side walls 49 and 50. The pins 46, 47 bear on the side wall 50 and displace the cartridge transversely to the direction of movement of the carriage. When the worm wheels 36 and 37 have been rotated through about 270°, the cartridge 3 has been displaced by more than one cartridge width so that the carriage is free. In this position of the worm wheel 37, a switch 51 in the circuit of the motor 23 is closed by a camwheel 53, which is coaxially mounted on the worm wheel 37. At the same time, a switch 52 is closed, which by-passes the switch 30 in the circuit of the motor 41. Thus, the operation of the motor 23 is resumed while the motor 41 continues to rotate the discs 36, 37 and 43, 45 to disengage the pins 46, 47 from the side walls of the cartridge. As soon as the discs 36, 37 and 43, 45 have reached their initial position, the switch 52, which is controlled by the cam 53, interrupts the motor circuit to stop this drive. At the same time, the disc 18, which is driven by the motor 23, is displaced to its receiving position. When the disc has been rotated through a total of 270°, the carriage 15 faces the guide opening 9 for supplying the cartridges containing unexposed film. In this position, the camwheel 24 interrupts the switch 31 so that the motor 23 is stopped again. The spring 11 pushes a cartridge 3 into the carriage (see FIG. 1). The side wall of the cartridge engages the pin 59 of the switch 58 to close the same so that the motor 23 is energized and pushes the carriage with the cartridge to the shooting position. In the forward end position of the carriage, the leaf spring 35 urges the cartridge 3 with a defined force against the aperture plate 66 of the camera. The feeler 55 bears on the side edge of the film to open the switch 54. In this position of the carriage 15, the extension 25 of the lever 26 is received by the recess in the camwheel 24 so that the switch 28 interrupts the circuit of the motor 23. A pivotal movement of the lever 26 in the counterclockwise sense causes the driving coupling element 8 of the cartridge drive to engage the driven coupling element 7 of the cartridge 3. When the film in this cartridge has been exposed, an indentation 56 in the side edge of the film reaches the feeler 55 so that another change of cartridges is initiated. A camera which is provided with such a cartridge changing device can be maintained ready for shooting for any desired time. During the shooting operation, cartridges containing unexposed film can be inserted into the guide opening 9 and cartridges containing exposed film can be removed from the guide opening 12.

The invention is not restricted to the embodiment shown by way of example. The means for driving the carriage may comprise a rack-and-pinion mechanism or a screw mechanism rather than a crank mechanism. For the transverse movement of the cartridge, a carriage system may be used which is similar to the system shown in the drawing for the longitudinal displacement of the cartridge. This transverse movement may alternatively be effected by a plunger, which engages the side wall of the cartridge. The means shown in the drawing for a fully automatic transfer of the cartridge may be replaced by a semi-automatic system. In this case, the unwinding of the entire film in the cartridge is indicated by suitable means and the longitudinal and transverse movements of the cartridges are effected or controlled by hand. A manual exchange of cartridges will mainly be suitable for underwater shots, where the camera is arranged in a water-tight housing and the means for changing the cartridges extend through these housings.

Instead of separate drive mechanisms for the longitudinal and transverse movements, as shown in the drawing, both movements may be derived from a common drive motor. In this case, the drive motor may be connected by intermittently acting transmissions to the two changing devices or may operate the same by means of clutches which are electromagnetically or mechanically controlled.

The cartridge changing operation may obviously be initiated by a footage counter, which in this case has the same function as the feeler which cooperates with an indentation in the edge of the film. Besides, means for an arbitrary initiation of the cartridge changing operation may be provided. In order to avoid interruptions in the shooting operation as far as possible, a feeler-operated switch may be arranged in the guide opening 9 to signal the absence of an adequate supply of cartridges. Such a feeler-operated switch is indicated in FIGS. 1 and 3 at 64 and lies in the circuit of a signal lamp 65, which is lighted when a sufficient supply of cartridges is not present.

I claim:

1. A motion picture camera, which comprises means defining a film chamber adapted to hold a film cartridge in a predetermined position for exposure, means for moving a film from a film cartridge held in said predetermined position along a predetermined path in said camera, a spare cartridge holder adapted to hold at least one spare cartridge, feeding means operable to move said spare cartridge from said holder to said predetermined position, cartridge change initiating means which are responsive to a predetermined movement of said film along said path and arranged to initiate by their response the operation of said feeding means.

2. A motion picture camera as set forth in claim 1, in which said cartridge charge initiating means comprise a feeler, which is arranged to engage a film moving along said path and to be released in response to the movement of the trailing end portion of said film along said path.

3. A motion picture camera as set forth in claim 2, for use with film cartridges in which the film has in its trailing end portion an indentation on one side edge portion, in which camera said feeler is arranged to engage said one side edge portion and to be released by said indentation.

4. A motion picture camera, which comprises means defining a film chamber adapted to hold a film cartridge in a predetermined position for exposure, means for moving a film from a film cartridge held in said predetermined position along a predetermined path in said camera, a spare cartridge holder adapted to hold at least one spare cartridge, feeding means operable to move said spare cartridge from said holder to said predetermined position, a feeding guide for guiding cartridges containing unexposed film from said spare cartridge holder to said chamber and a discharge guide for guiding cartridges containing exposed film out of said chamber, said discharge guide being offset from said feeding guide.

5. A motion picture camera as set forth in claim 4, which comprises means defining an optical axis of said camera, which optical axis intersects said predetermined path, and in which said discharge guide is offset from said feeding guide in the direction of said optical axis.

6. A motion picture camera as set forth in claim 4, in which said cartridge change initiating means comprise a feeler, which is arranged to engage a film moving along said path and to be released in response to the movement of the trailing end portion of said film along said path.

7. A motion picture camera, which comprises means defining a film chamber adapted to hold a film cartridge in a predetermined position for exposure, means for moving a film from a film cartridge held in said predetermined position along a predetermined path in said camera, a spare cartridge holder adapted to hold at least one spare cartridge, feeding means operable to move said spare cartridge from said holder to said predetermined position, means defining an optical axis of said camera, and an aperture plate defining said predetermined path and intersecting said optical axis, and in which said feeding means comprise a carriage having one end facing said aperture plate, said carriage being movable in the direction of said optical axis between a forward position close to said aperture plate and a rear position spaced from said aperture plate, said carriage in its forward position being adapted to hold a film cartridge in said predetermined position, resilient means carried by said carriage at the other end thereof and arranged to urge a cartridge, which is held in said predetermined position, against said aperture plate, said carriage carrying at said one end an extension engageable with a cartridge in said predetermined position and to cause the same to follow a movement of said carriage from said forward to said rear position.

8. A motion picture camera as set forth in claim 7, for use with cartridges having top and bottom surfaces formed with recesses, in which camera said discharge means comprise at least two pairs of rotatable members, and means for rotating said members, each of said rotatable members carrying an eccentric pin, said pins being adapted to engage said recesses in a cartridge disposed in said chamber when said carriage is in its rear position, said rotatable members being mounted so that upon rotation of said rotatable members said pins engage said recesses and cause said cartridge to move transversely to the direction of movement of said carriage between said forward and rear positions.

9. A motion picture camera as set forth in claim 7, for use with film cartridges in which the film has in its trailing end portion an indentation on one side edge portion, in which camera said feeler is arranged to engage said one side edge portion and to be released by said indentation.

10. A motion picture camera as set forth in claim 7, in which said cartridge change initiating means comprise a feeler, which is arranged to engage a film moving along said path and to be released in response to the movement of the trailing end portion of said film along said path.

11. A motion picture camera as set forth in claim 7, for use with film cartridges in which the film has in its trailing end portion an indentation on one side edge portion, in which camera said feeler is arranged to engage said one side edge portion and to be released by said indentation.

12. A motion picture camera as set forth in claim 7, which comprises an electric motor and a crank mechanism operatively connecting said motor to said carriage and operable by said motor to move said carriage between said forward and rear positions.

13. A motion picture camera as set forth in claim 12, which comprises a shaft in said crank mechanism, a cam mounted on said shaft, and a switch controlled by said cam and in circuit with said motor.

14. A motion picture camera as set forth in claim 12, for use with cartridges comprising a driven coupling element adapted to be driven by said means for moving a film, in which camera said means for moving said film comprise a driving coupling element, said camera comprising a pivoted plate carrying said driving coupling element and pivotally movable to move the same between engaged and disengaged positions with respect to the driven coupling element of a cartridge held in said predetermined position, said plate having an extension, said crank mechanism comprising a crankshaft, and a cam being mounted on said crankshaft and engaging said extension and operable by said crankshaft to move said driving coupling element from said engaged position to said disengaged position before said crank mechanism moves said carriage from said forward position to said rear position.

15. A motion picture camera as set forth in claim 7, which comprises a discharge guide for receiving cartridges containing exposed film from said chamber and discharge means operable to move a cartridge from said chamber into said discharge guide when said carriage is in said rear end position.

16. A motion picture camera as set forth in claim 15, which comprises a crankshaft operatively connected to said carriage and operable to move the same between said forward and rear position, and in which said discharge means comprise an electric motor, a discharge-initiating switch in circuit with said motor, and a cam mounted on said crankshaft and controlling said discharge-initiating switch.

17. A motion picture camera as set forth in claim 16, in which said discharge means are movable between an initial position and at least one further position, and which comprise a by-pass switch adapted to by-pass said discharge-initiating switch, said by-pass switch being closed unless said discharge means are in said initial position.

18. A motion picture camera as set forth in claim 15, which comprises an electric motor for moving said carriage between said forward and rear positions and a control switch in circuit with said motor, said control switch being disposed in the path of said discharge means and operable thereby to energize said motor when said discharge means have moved said carriage by at least one cartridge width.

19. A motion picture camera as set forth in claim 7, which comprises a motor operatively connected to said carriage and energizable to move said carriage between said forward and rear positions, a control switch in circuit with said motor, and a feeler for controlling said control switch and engageable by a cartridge in said chamber, said feeler being arranged to close said control switch only when engaged by a cartridge.

20. A motion picture camera as set forth in claim 19, which comprises a feeding guide for guiding cartridges containing unexposed film from said spare cartridge holder to said chamber, a by-pass switch adapted to by-pass said control switch, and a cam operable by said motor and arranged to open said by-pass switch when said carriage is in registry with said feeding guide.

References Cited
UNITED STATES PATENTS

| | | | |
|---|---|---|---|
| 2,326,980 | 8/1943 | Steiner | 352—72 |
| 2,755,030 | 7/1956 | D'Ornellas | 352—123 X |
| 2,912,899 | 11/1959 | Wangerin | 352—72 |

FOREIGN PATENTS 987,795  4/1951  France.

NORTON ANSHER, Primary Examiner
M. H. HAYES, Assistant Examiner

U.S. Cl. X.R.

352—74